United States Patent [19]
Vandaele

[11] Patent Number: 5,884,581
[45] Date of Patent: Mar. 23, 1999

[54] FEEDING DEVICE FOR POULTRY

[76] Inventor: Antoine Achiel Vandaele, Tieltsesteenweg 147, 9900 Eeklo, Belgium

[21] Appl. No.: 885,422

[22] Filed: Jun. 30, 1997

[30] Foreign Application Priority Data

Jul. 3, 1996 [NL] Netherlands .......................... 1003490

[51] Int. Cl.$^6$ ................................................. A01K 39/014
[52] U.S. Cl. .......................................... 119/52.4; 119/57.4
[58] Field of Search .................................. 119/57.2, 57.3, 119/57.4, 52.2, 52.3, 52.4, 53, 53.5, 54

[56] References Cited

U.S. PATENT DOCUMENTS 5,101,765  4/1992  Manfrin ..................................... 119/53
5,275,131  1/1994  Brake et al. ........................... 119/52.4

FOREIGN PATENT DOCUMENTS 0 421 553 A1  4/1991  European Pat. Off. ..... A01K 39/012
WO 94/07360  4/1994  WIPO .......................... A01K 39/012

OTHER PUBLICATIONS

Poultry International, Feb. 1996, US, pp. 62–63, XP002025892 "Products Slide Valve and Male Restriction Bonnet".

Poultry International, part 26, No. 5, May 1987, Mount Morrris (US), p.65 XP002025893 "Products".

*Primary Examiner*—Thomas Price
*Attorney, Agent, or Firm*—Deveau, Colton & Marquis

[57] ABSTRACT

A device for feeding poultry comprises a substantially dish-shaped pan, above which a feed drop tube is disposed, which drop tube opens out above a central part of the pan. At least one grill with bars extends between the feed drop tube and the pan. Provision is made for a second grill with bars, which second grill is fitted adjacent to the first grill. The first and the second grill are movable relative to each other.

18 Claims, 7 Drawing Sheets

FEEDING DEVICE FOR POULTRY

BACKGROUND OF THE INVENTION

The invention relates to a device for feeding poultry, comprising a substantially dish-shaped pan, above which a feed drop tube is disposed, which drop tube opens out above a central part of the pan, while at least one grill with bars extends between the feed drop tube and the pan.

DISCUSSION OF THE PRIOR ART

Feeding devices have been known for a long time in many different forms, for example from EP-A-421 553 or WO-A-94/07360. In the simplest forms the feeding device has only three main parts: the dish-shaped pan, the feed drop tube and the grill. The feed drop tube is connected—by way of a system of feed conveyance pipes or otherwise—to a feed reservoir, from which feed can be taken through the feed drop tube into the pan of the feeding device. In more developed embodiments, which are described in, for example, the abovementioned patent applications, the feeding device is additionally provided with means for adjusting the quantity and level of feed in the feeding device.

When the known feeding device is used for rearing mother birds, the feeding devices are set up in a poultry house in such a way that the mother birds can move around the feeding devices and can eat from them by putting their heads through the apertures of the grill, in order to reach the feed lying in the pan. When the mother birds are about 19–21 weeks old, they are sexually mature and begin to lay eggs. In this period male birds are added to the bird population in the poultry house, in order to ensure that the eggs are fertilized.

The male and female birds in the same poultry house must eat different feed, so that it is important to take measures to prevent the male birds from eating from the feeding devices intended for feeding the female birds. Of course, female birds must also be prevented from eating from feeding devices intended specifically for the male birds, but a solution to this problem will not be discussed here.

Given the fact that the head of a male bird is broader than the head of a female bird, it was known until now to fix an overlay grill over the existing grill of the feeding device, thereby limiting the width of access to the feed in the pan through the apertures of the grills.

This known solution is not very satisfactory, since the birds are not yet fully grown at the beginning when the males are mixed with the female birds, and their heads therefore have smaller dimensions than is the case some time later, while the overlay grill limits access to specific dimensions and no account is taken of the changing anatomy of the birds. Nor can account be taken of different breeds of poultry with their own specific head width.

SUMMARY OF THE INVENTION

The object of the invention is to provide a feeding device which overcomes the abovementioned drawbacks and can be used for different breeds of poultry at various stages of growth.

To this end, in the feeding device according to the invention provision is made for a second grill with bars, which second grill is fitted adjacent to the first grill, and in that the first grill and second grill are movable relative to each other, for setting the dimensions of grill apertures determined at least partially by the bars of the first grill and at least partially by the bars of the second grill.

Owing to the fact that the first grill and the second grill are movable relative to each other, the feeding device according to the invention makes it possible to adapt the dimensions of the grill apertures very accurately to the dimensions of the head of the mother birds concerned, at a specific growth stage for allowing through said head, with the result that the head of the corresponding male birds will not be able to pass through the grill apertures. On further growth of the mother birds the grill apertures can simply be increased, in order to allow through the larger head of the mother birds and to prevent the head of the male birds, which has likewise grown larger, from passing through.

In a preferred embodiment one of the abovementioned first and second grills is immovably fixed to the pan. The feeding device consequently need only contain one movable grill, so that the structure of the feeding device can be simple and can be very similar to a conventional feeding device. In order to protect the movable grill as much as possible from the action of the birds, where another grill is immovably fixed to the pan, the movable grill is preferably situated between the feed drop tube and the fixed grill.

In a preferred embodiment means are provided for fixing one of the abovementioned grills in a number of predetermined positions relative to the other grill. Such positions can be selected in such a way that, for example, the grill aperture can be set in steps of 1 mm or a part thereof in a particular range (for example, a width of 40–50 mm). Of course, it is also possible to make a continuous adjustment of the one grill relative to the other, and thus a continuous adjustment of the dimensions of the grill apertures.

Since the feeding devices are generally of a substantially circular symmetrical design, it is preferable for the feeding device to be designed in such a way that one of the abovementioned grills is rotatable relative to the other grill, in which case the axis of rotation substantially coincides with the central longitudinal axis of the feed drop tube.

It is expedient for the bars of the first grill and the bars of the second grill to run at least partially parallel to each other. In this case the central longitudinal axis of each bar can extend substantially in a plane through the central longitudinal axis of the feed drop tube. The number of bars of the one grill can be equal to the number of bars of the other grill. The width of each bar of the one grill can be substantially equal to the width of each bar of the other grill. This last measure ensures that the bars can be made to coincide fully with each other, while moving one grill relative to the other grill produces the maximum grill dimension adjustment range with the maximum grill aperture dimensions.

When the poultry breeder has determined the desired dimensions of the grill apertures of the feeding device, said dimensions can be set, after which the grills in the feeding device must be fixed relative to each other in each case. To this end, according to the invention, the first grill is provided with first fixing means which are adapted to interact with second fixing means fitted on the second grill, for fixing the first grill in a number of predetermined positions relative to the second grill. Of course, it is also possible to fit fixing means which produce fixing between the first grill and the pan, the first grill and the feed drop tube, the second grill and the pan and/or the second grill and the feed drop tube.

In a preferred embodiment the first fixing means of the first grill consist of recesses, and the second fixing means of the second grill consist of at least one lug. If it is ensured that the distance between the recesses, measured in the plane of the recesses, is smaller than the distance between the bars of the first grill, a possibility for stepwise adjustment of the grill apertures is created in a particularly simple way, using only one lug on the second grill which interacts with the recesses.

In a further preferred embodiment the second grill is movable relative to the first grill in the direction of the central longitudinal axis of the feed drop tube, between a first end position, in which the first fixing means interact with the second fixing means for fixing the first grill in a predetermined position relative to the second grill, and a second end position, in which the first and the second fixing means are inoperative. These measures mean that the fixing mechanism formed by the first and the second fixing means can be made inoperative in a simple outside of the feeding device. In such an embodiment the first grill is preferably provided with third fixing means, which are intended to interact with fourth fixing means fitted on the second grill, for fixing the second grill in its second end position in at least one predetermined position relative to the first grill. The third fixing means very expediently consist of a locking element which is movable in a plane through the central longitudinal axis of the feed drop tube, and the fourth fixing means consist of at least one recess.

The claims and advantages will be more readily appreciated as the same becomes better understood by reference to the following detailed description and considered in connection with the accompanying drawings in which like reference symbols designate like parts.

DESCRIPTION OF THE PREFERRED EMBODIMENTS

Figure 1:
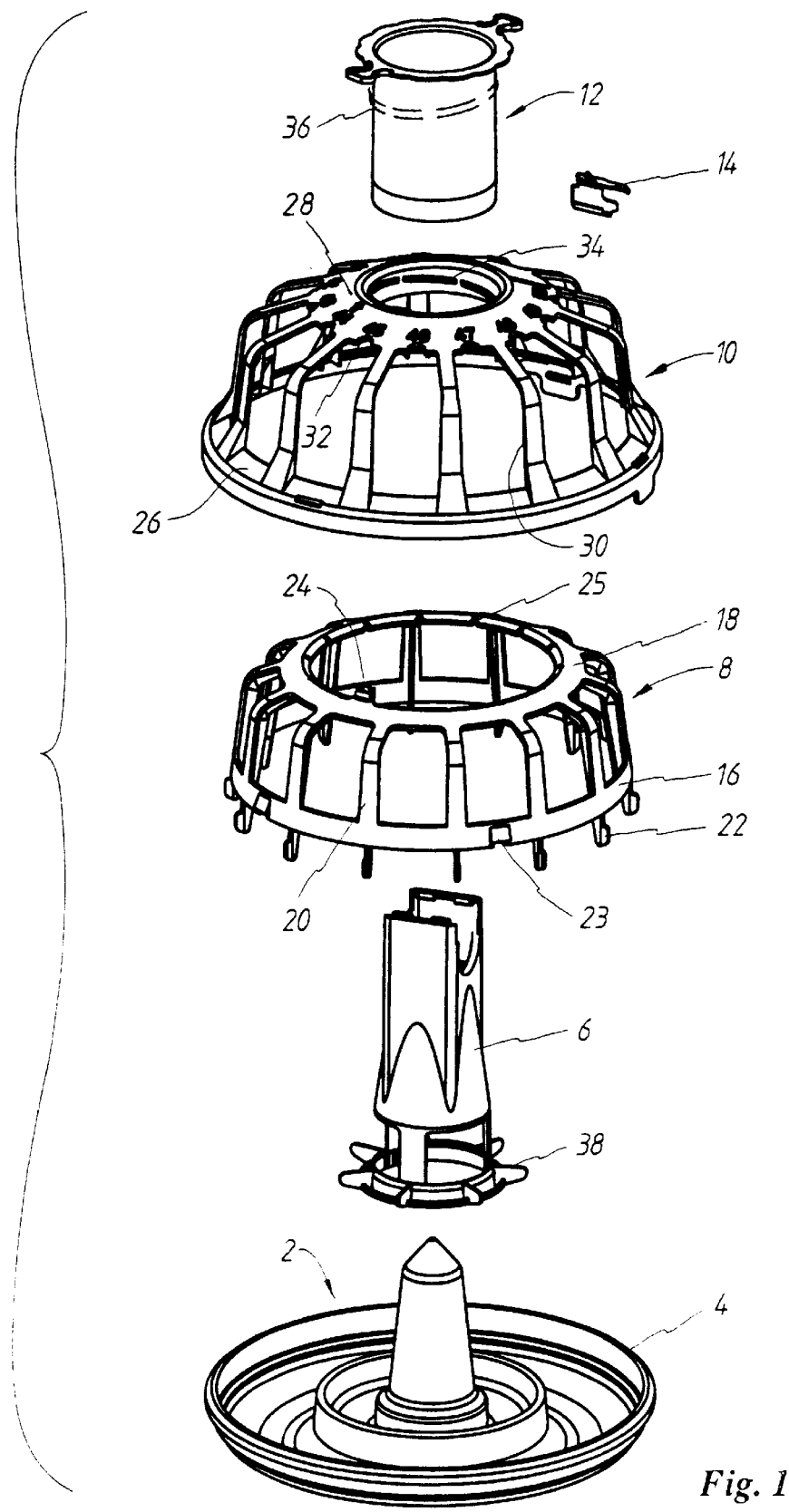
FIG. 1 shows in perspective a feeding device according to the invention, in disassembled form.

FIG. 1 shows a substantially dish-shaped pan 2 with a raised edge 4, a feed drop tube 6, an inner grill 8, an outer grill 10, an adjusting collar 12, and a locking clip 14.

The inner grill 8 is substantially constructed of a lower ring 16, an upper ring 18, and a number (in this case, fourteen) of partially curved elongated bars 20 extending between the lower ring 16 and the upper ring 18. The lower ring 16 is provided with hooked lugs 22 along the edge facing away from the bars 20. Supporting lugs 23 are fitted on the outside of the lower ring 16. The edge of the upper ring 18 facing away from the bars 20 bears a locking lug 24 and is provided with recesses 25. The function of the hooked lugs 22, the supporting lugs 23, the locking lug 24 and the recesses 25 will be described in greater detail below.

The outer grill 10 comprises a clamping ring 26, a collar 28, and a number (in the case shown, fourteen) of partially curved, elongated bars 30 extending between the clamping ring and the collar 28. The clamping ring 26 is intended for snapping around the raised edge 4 of the pan 2, for a fixed connection thereto. At the edge facing the bars 30, the collar 28 is provided with locking recesses 32, which are adapted for interaction with the locking lug 24 of the inner grill 8, in a manner which will be discussed in greater detail below. The collar 28 is also provided with screw thread 34, which is adapted for interaction with screw thread 36 of the adjusting collar 12, for adjusting the height of the bottom end of the adjusting collar 12 above the pan 2. Said bottom end serves as a stop for the top side of wings 38 of feed drop tube 6 in its top position, which position determines the level of the feed conveyed through the feed drop tube 6 in the pan 2.

Figure 2:
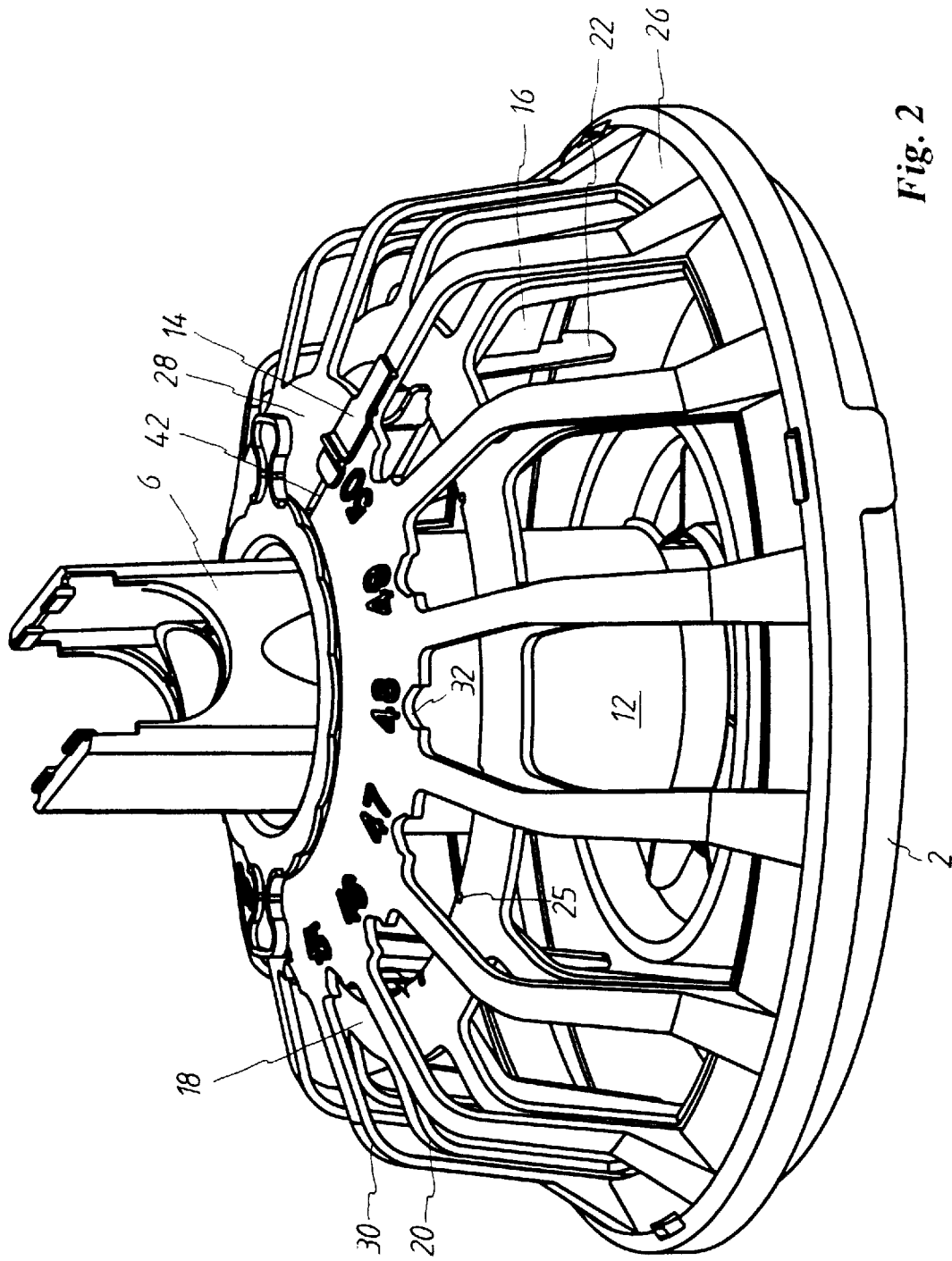
FIG. 2 shows in perspective on an enlarged scale an assembly of the feeding device according to FIG. 1 with a movable grill in the second end position.
Figure 3:
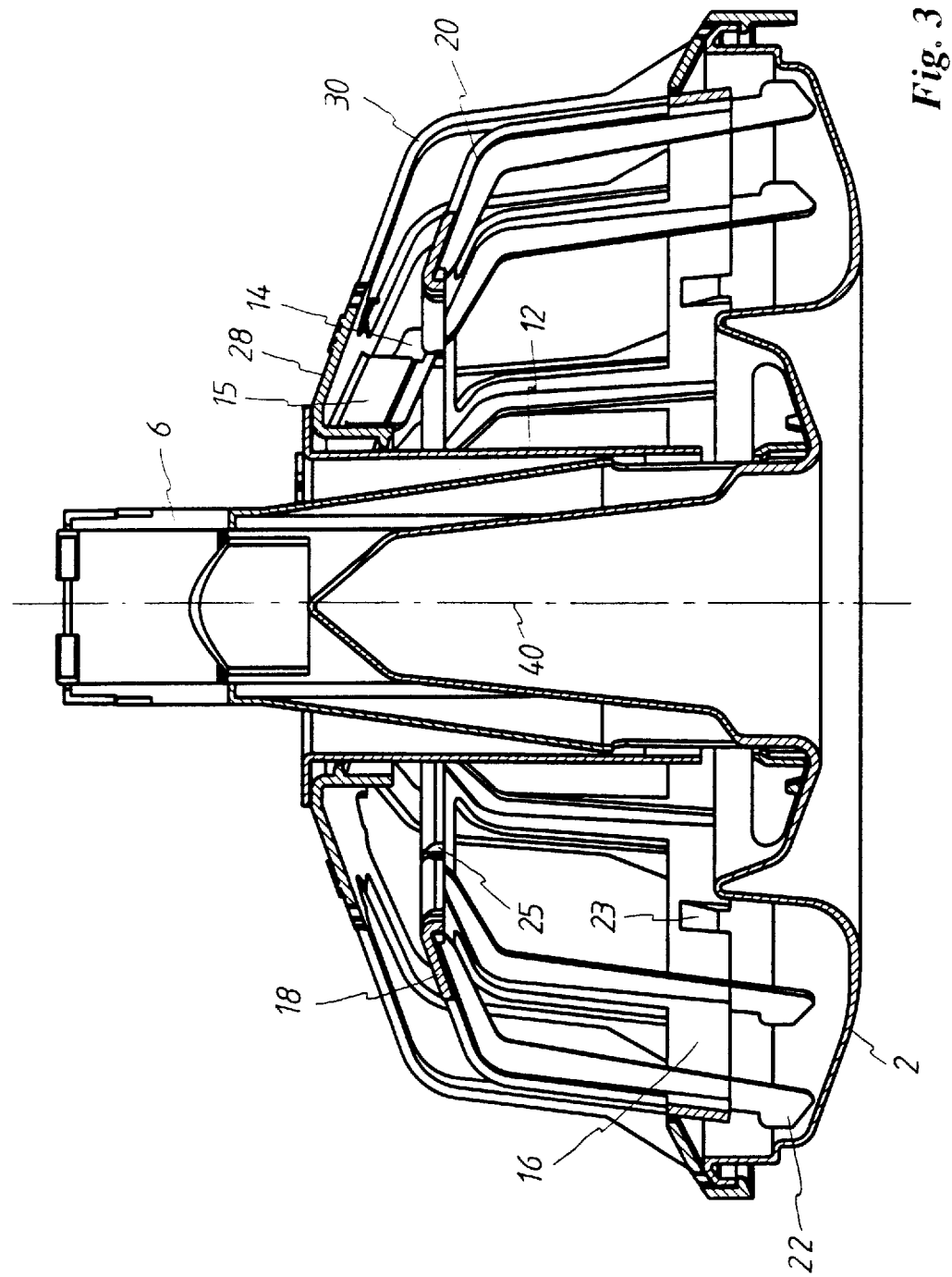
FIG. 3 shows a cross-section of the feeding device according to FIG. 2.

FIGS. 2 and 3 show the feeding device according to the invention in assembled form, in which the inner grill 8 is in its bottom (second) end position: the hooked lugs 22 rest substantially on the bottom of the pan 2, the top edge of the lower ring 16 lies substantially flush with the top edge of the clamping ring 26, and the bars 20 of the inner grill 8 are adjacent to and lie behind the bars 30 of the outer grill 10. In the tangential direction and in a direction parallel to the central longitudinal axis of the direction parallel to the central longitudinal axis of the feed drop tube 6 the inner grill is fixed in the second end position by the fact that a wing of the locking clip 14 engages in a recess 25 of the upper ring 18 of the inner grill 8. The feeding device in the setting shown in FIGS. 2 and 3, in which the width of the grill apertures is maximum, is suitable for feeding mother birds from one day old until the time at which male birds are placed in the group of mother birds.

Figure 4:
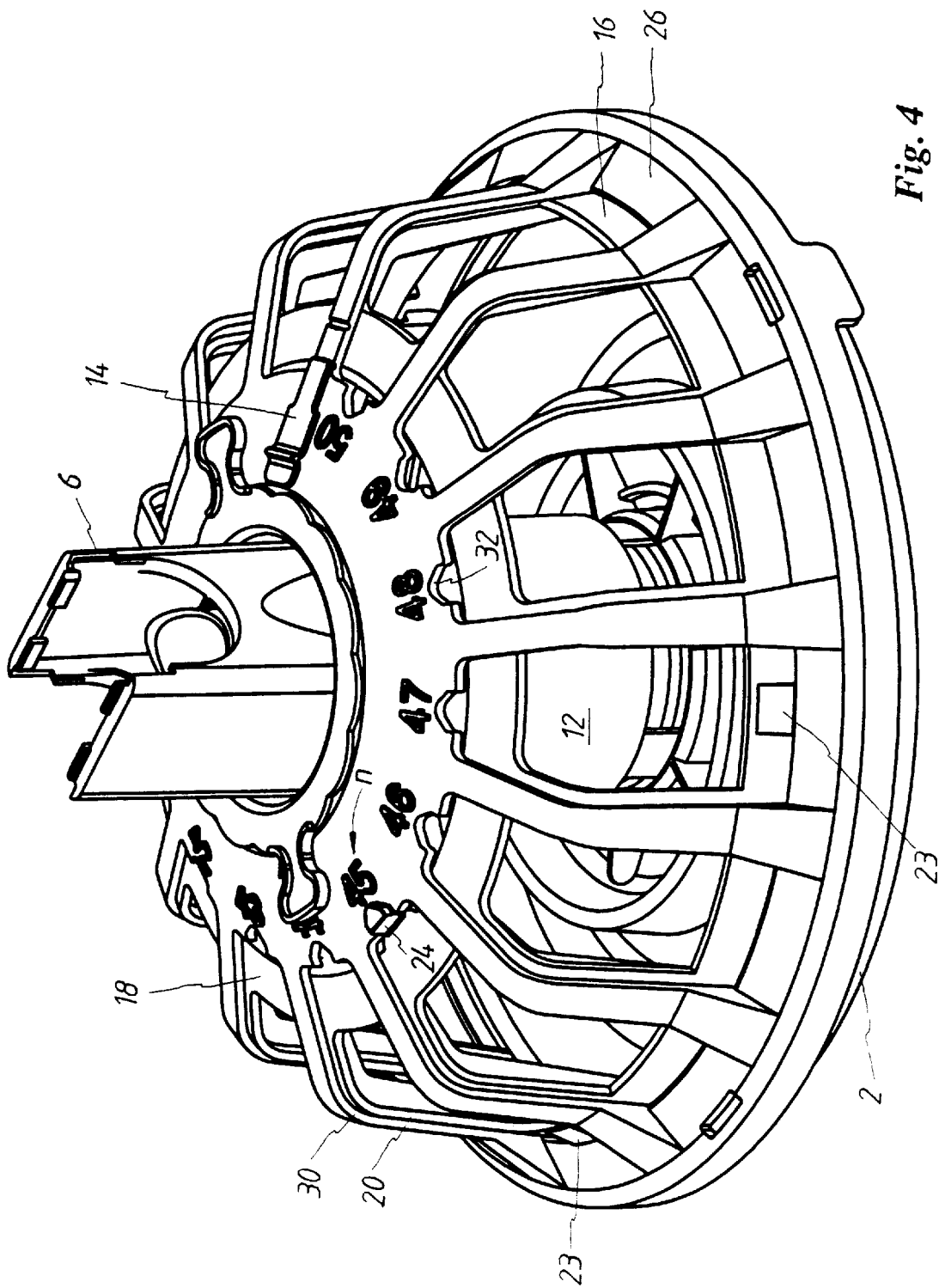
FIG. 4 shows in perspective on an enlarged scale an assembly of the feeding device according to FIG. 1 with a movable grill in the first end position.
Figure 5:
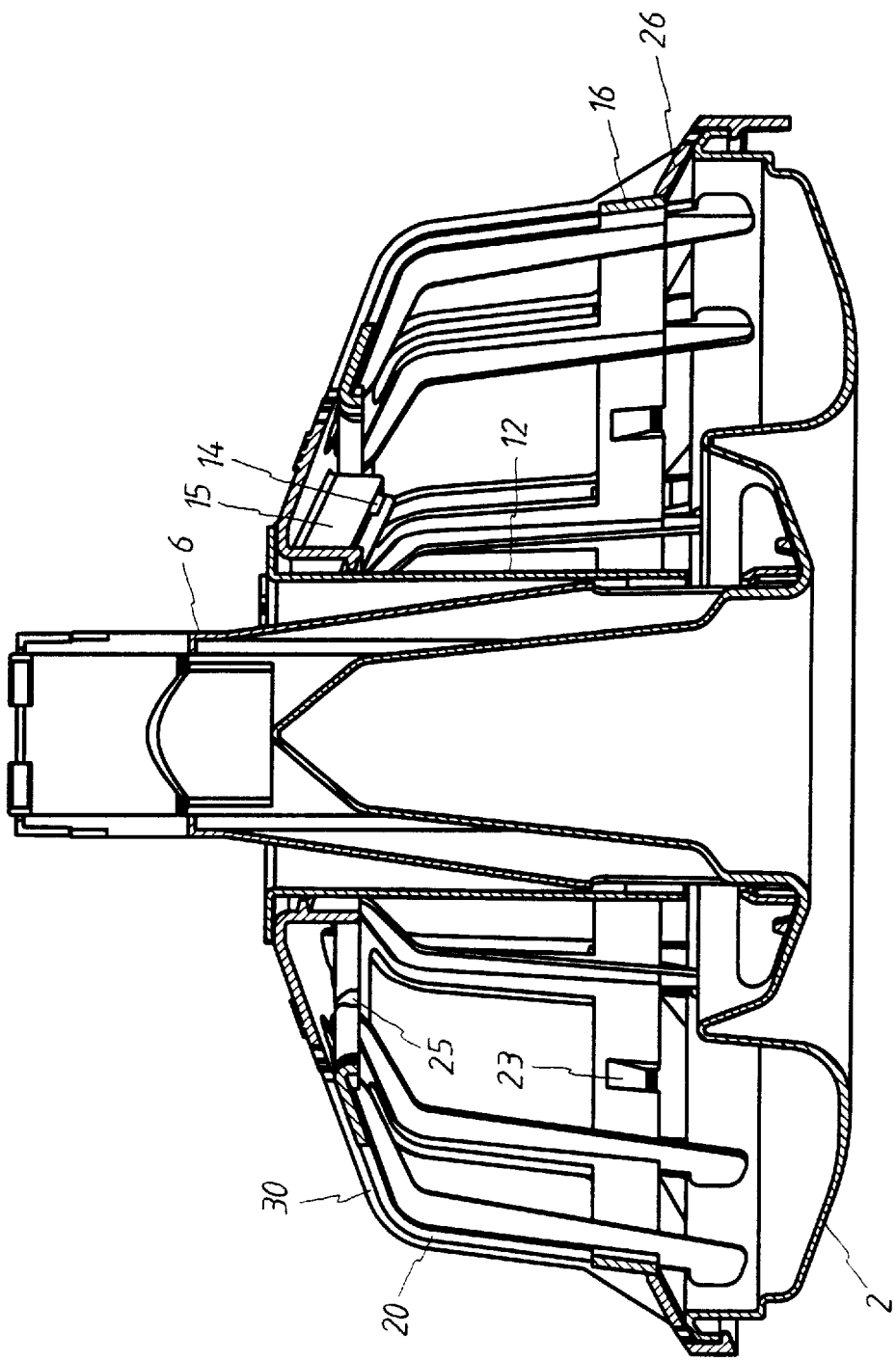
FIG. 5 shows a cross-section of the feeding device according to FIG. 4.

The locking clip 14 can be moved from the position shown in FIGS. 2 and 3 between guide faces 15 in a groove 42 to a position closer to the feed drop tube 6, as a result of which the locking of the inner grill 8 is released. The inner grill 8 can then be rotated in the tangential direction and moved upwards into such a specific tangential position that the locking lug 24 moves into a preselected locking recess 32, as FIGS. 4 and 5 illustrate. The supporting lugs 23 in this case snap over the top edge of the clamping ring 26 of the outer grill 10, with the result that a top (first) end position of the inner grill 8 is fixed. In the top end position of the inner grill 8 the lower ring 16 projects above the top edge of the clamping ring 26 of the outer grill 10, and in this way forms a raised edge of the pan 2, which prevents spillage of feed from the pan by the mother birds.

By a suitable choice of the positions of the locking lug 24 and the locking recesses 32, it is possible to set a grill aperture which has a width in millimeters equal to the number n noted for each recess. In FIG. 4 the distance between each bar 20 of the inner grill 8 and the next bar 30 of the outer grill 10 is always 45 mm, as the number n near the locking lug 24 indicates.

Figure 6:
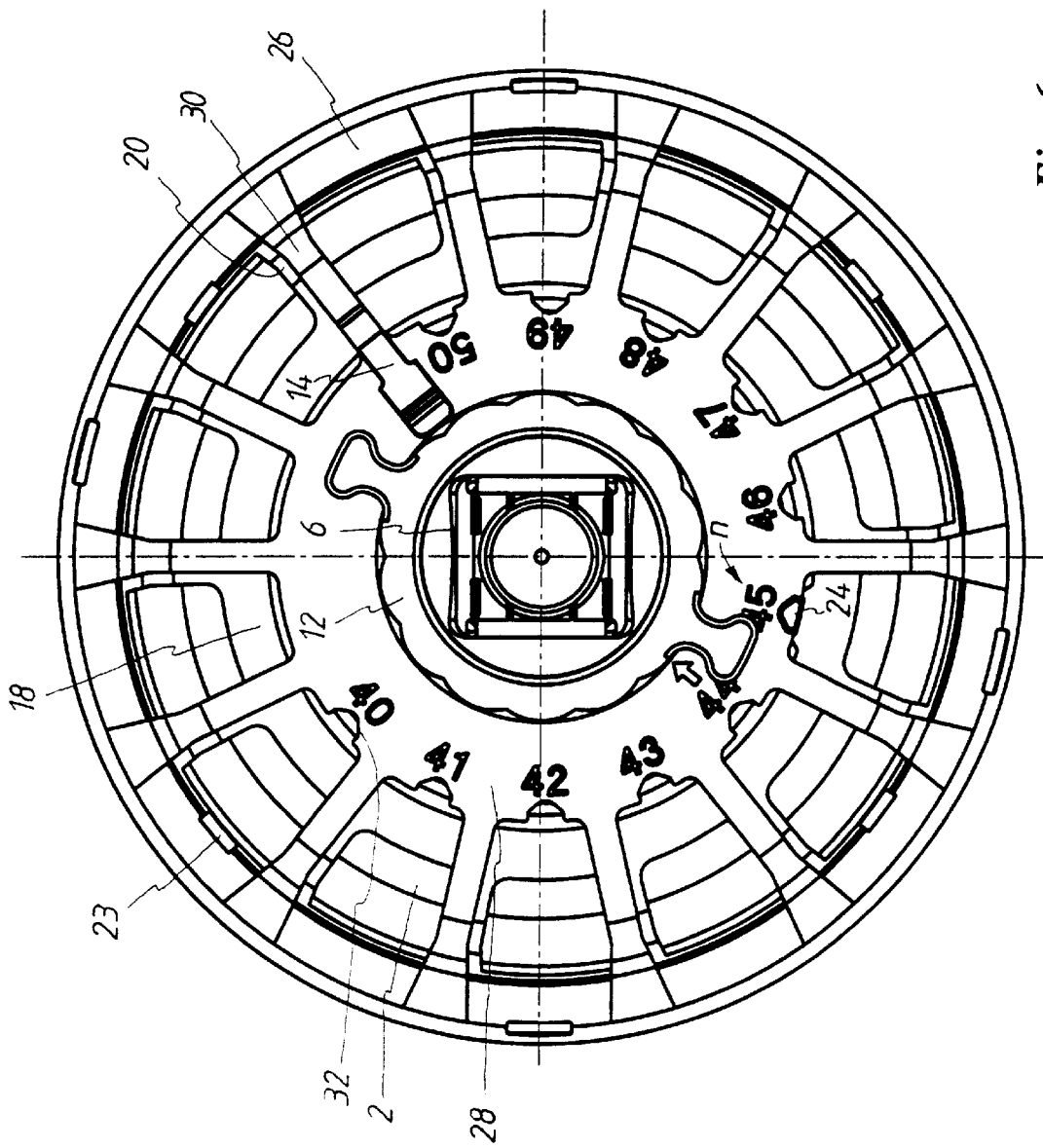
FIG. 6 shows a top view of the feeding device according to FIGS. 4 and 5.

FIG. 6 illustrates further the way in which the width adjustment of the grill apertures is obtained by rotating the inner grill 8 relative to the outer grill 10. It can be seen clearly in the figure that the recesses which belong in succession to the noted numbers n of 40, 41, 42, . . . , 50 change position stepwise along the edge of the collar 28 facing away from the feed drop tube 6: the situated to the right of the centre of the grill aperture of the outer grill 10 determined by the bars 30, while the locking recess 32 which belongs to the number 50 is situated to the left of the centre of the grill aperture of the outer grill 10 determined by the bars 30. This means that the distances between the locking recesses 32 are smaller than the distances between the bars 30, measured along the side of the collar 28 facing away from the feed drop tube 6, or measured in angular measurements. It will be clear from FIG. 6 that the bars 20 of the inner grill 8 emerge increasingly further from under the bars 30 of the outer grill 10 as the number for the locking recess 32 in which the locking lug 24 is situated becomes smaller. The width of the grill apertures determined by the bars 20 and 30 decreases accordingly.

Figure 7:
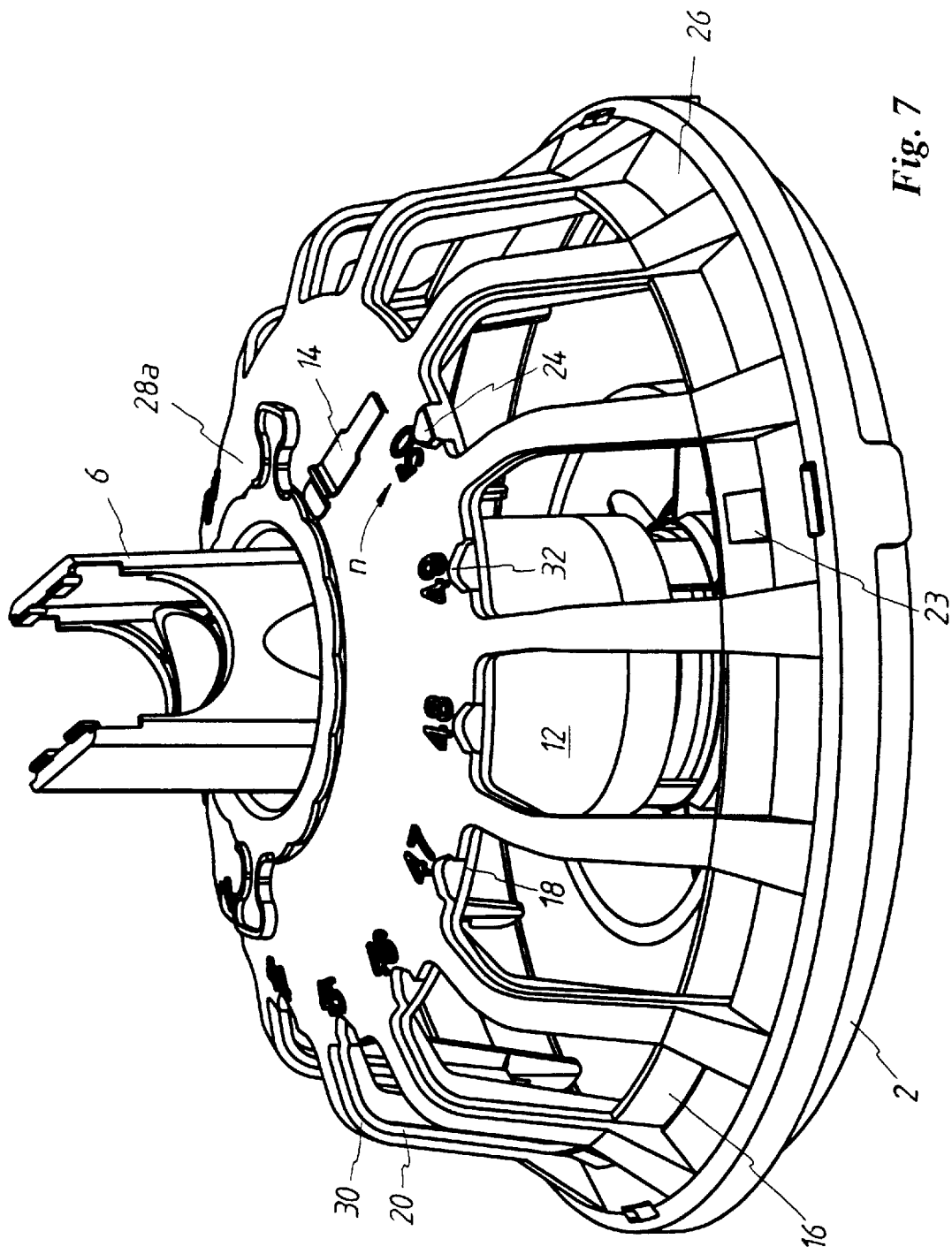
FIG. 7 shows in perspective another embodiment of the feeding device according to the invention.

In the alternative embodiment illustrated in FIG. 7 the width of the collar 28a is selected at such a size that the upper ring 18 of the inner grill 8 falls entirely under the collar 28. For the rest, the feeding device according to FIG. 7 is constructed as shown in FIGS. 1–6. In FIG. 7 the inner grill 8 is fixed in such a position relative to the outer grill 10 (the locking lug 24 is situated in the locking recess 32 at n=50) that the grill width is the maximum: the bars 20 are situated fully behind the bars 30.

It will be clear that it is not necessary to connect the outer grill 10 immovably to the pan 2; both the inner grill 8 and the outer grill 10 can be disposed movably relative to the pan 2. It is also possible, instead of providing the locking lug 24 on the inner grill 8 and the locking recesses 32 on the outer grill 10, to provide a locking lug on the outer grill 10 and locking recesses 32 on the inner grill 8, or to provide similar mutually interacting fixing means on the lower ring 16 and the clamping ring 26.

While the invention has been described and illustrated in its preferred embodiments, it should be understood that departures may be made therefrom within the scope of the invention, which is not limited to the details disclosed herein.

What is claimed is:

1. A device for feeding poultry, comprising a substantially dish-shaped pan, above which a feed drop tube is disposed, which drop tube opens out above a central part of the pan, while at least one grill with bars extends between the feed drop tube and the pan, the device further comprising a second grill with bars, which second grill is fitted adjacent to the first grill, and in that the first grill and second grill are movable relative to each other, for setting the dimensions of the grill apertures determined at least partially by the bars of the first grill and at least partially by the bars of the second grill.

2. The device of claim 1, wherein one of said first and second grills is immovably fixed to the pan.

3. The device of claim 2, wherein the other grill is situated between the feed drop tube and the one grill.

4. The device of claim 1, comprising means for fixing one of said grills in a number of predetermined positions relative to the other grill.

5. The device of claim 1, wherein one of said grills is rotatable relative to the other grill, the axis of rotation substantially coinciding with the central longitudinal axis of the feed drop tube.

6. The device of claim 1, wherein the bars of the first grill and the bars of the second grill run at least partially parallel to each other.

7. The device of claim 1, wherein the central longitudinal axis of each bar extends substantially in a plane through the central longitudinal axis of the feed drop tube.

8. The device of claim 1, wherein the number of bars of the one grill is equal to the number of bars of the other grill.

9. The device of claim 1, wherein the width of each bar of the one grill is substantially equal to the width of each bar of the other grill.

10. The device of claim 1, wherein the first grill is provided with first fixing means which are adapted to interact with second fixing means fitted on the second grill, for fixing the first grill in a number of predetermined positions relative to the second grill.

11. The device of claim 10, wherein the first grill comprises a collar which adjoins the feed drop tube and bears the first fixing means, the second fixing means being provided on a collar of the second grill facing the collar of the first grill.

12. The device of claim 11, wherein the first fixing means are provided on the side of the collar of the first grill facing away from the feed drop tube.

13. The device of claim 10, wherein the first fixing means consist of recesses, and in that the second fixing means consist of at least one lug.

14. The device of claim 13, wherein the distance between the recesses of the first grill is smaller than the distance between the bars of the first grill.

15. The device of claim 10, wherein the second grill is movable relative to the first grill in the direction of the central longitudinal axis of the feed drop tube, between a first end position in which the first fixing means interact with the second fixing means, for fixing the first grill in a predetermined position relative to the second grill, and a second end position, in which the first and the second fixing means are inoperative.

16. The device of claim 15, wherein the first grill is provided with third fixing means, which are intended to interact with fourth fixing means fitted on the second grill, for fixing the second grill in its second end position in at least one predetermined position relative to the first grill.

17. The device of claim 16, wherein the first grill comprises a collar which adjoins the feed drop tube and bears the third fixing means, the fourth fixing means being provided on a collar of the second grill facing the collar of the first grill.

18. The device of claim 16, wherein the third fixing means consist of a locking element which is movable in a plane through the central longitudinal axis of the feed drop tube, and in that the fourth fixing means consist of at least one recess.

* * * * *